(12) United States Patent
Hinton et al.

(10) Patent No.: US 7,067,107 B2
(45) Date of Patent: Jun. 27, 2006

(54) FURNACE AND STEAM REFORMING PROCESS

(75) Inventors: Peter Hinton, Isleworth (GB); Roger K. Bence, London (GB); Michael Hilton, Stockton-on-Tees (GB); Mark A. Linthwaite, Northallerton (GB)

(73) Assignee: Davy Process Technology Limited, London (GB)

( * ) Notice: Subject to any disclaimer, the term of this patent is extended or adjusted under 35 U.S.C. 154(b) by 277 days.

(21) Appl. No.: 10/479,908

(22) PCT Filed: Jun. 5, 2002

(86) PCT No.: PCT/GB02/02549

§ 371 (c)(1),
(2), (4) Date: Dec. 5, 2003

(87) PCT Pub. No.: WO02/098789

PCT Pub. Date: Dec. 12, 2002

(65) Prior Publication Data

US 2004/0136903 A1    Jul. 15, 2004

(30) Foreign Application Priority Data

Jun. 6, 2001    (GB) .................................. 0113788.4

(51) Int. Cl.
*C01B 3/24* (2006.01)
*C01B 3/26* (2006.01)
*B01J 8/00* (2006.01)

(52) U.S. Cl. ................ 423/650; 423/418.2; 423/437.1; 423/651; 423/652; 422/129; 422/187; 422/204; 422/211; 422/219; 422/232; 422/239; 252/373; 141/12

(58) Field of Classification Search ................ 423/650, 423/651, 652; 418.2, 437.1; 422/129, 187, 422/204, 211, 219, 232, 239; 252/373; 141/12
See application file for complete search history.

(56) References Cited

U.S. PATENT DOCUMENTS 2,203,840 A    6/1940    Perkins (Continued)

FOREIGN PATENT DOCUMENTS

DE    1 296 127    5/1959

(Continued)

OTHER PUBLICATIONS

International Search Report for International Application No. PCT/GB 02/02549, mailed Sep. 12, 2002, 3 pgs.

*Primary Examiner*—Stanley S. Silverman
*Assistant Examiner*—Timothy C. Vanoy
(74) *Attorney, Agent, or Firm*—Senniger Powers

(57) ABSTRACT

A steam reforming furnace has a plurality of substantially vertical reformer tubes. Each reformer tube has a feed inlet at its lower end, an outlet at its upper end, and a catalyst containment zone disposed intermediate its upper and lower ends and contains a charge of a particulate steam reforming catalyst which is insufficient to fill completely the catalyst containment zone. An upper retainer means is mounted at the upper end of the catalyst containment zone and is permeable to gas or vapor but retains particles of the catalyst in the catalyst containment zone. A follower means is movably mounted in the catalyst containment zone beneath the charge catalyst for movement upwardly from a lower end of the containment zone upon upward flow of gas through the catalyst containment zone at a rate beyond a threshold rate.

34 Claims, 4 Drawing Sheets

U.S. PATENT DOCUMENTS

| | | | |
|---|---|---|---|
| 3,628,314 A | 12/1971 | McCarthy et al. | |
| 3,818,667 A | 6/1974 | Wagner | |
| 3,838,977 A | 10/1974 | Warren | |
| 3,990,858 A | 11/1976 | O'Sullivan et al. | |
| 4,029,486 A | 6/1977 | Frantz | |
| 4,051,019 A | 9/1977 | Johnson | |
| 4,052,166 A | 10/1977 | Mita et al. | |
| 4,063,900 A | 12/1977 | Mita et al. | |
| 4,077,530 A | 3/1978 | Fukusen et al. | |
| 4,098,587 A | 7/1978 | Krar et al. | |
| 4,098,588 A | 7/1978 | Buswell et al. | |
| 4,098,589 A | 7/1978 | Buswell et al. | |
| 4,203,950 A | 5/1980 | Sederquist | |
| 4,292,274 A | 9/1981 | Faitani et al. | |
| 4,336,042 A | 6/1982 | Frantz et al. | |
| 4,430,304 A | 2/1984 | Spurrier et al. | |
| 4,489,549 A | 12/1984 | Kasabian | |
| 4,505,105 A | 3/1985 | Ness | |
| 4,554,784 A | 11/1985 | Weigand et al. | |
| 4,997,465 A | 3/1991 | Stanford | |
| 5,098,453 A | 3/1992 | Turner et al. | |
| 5,118,331 A | 6/1992 | Garrett et al. | |
| 5,247,970 A | 9/1993 | Ryntveit et al. | |
| 5,567,398 A | 10/1996 | Ruhl et al. | |
| 5,718,881 A | 2/1998 | Sederquist et al. | |
| 5,766,555 A * | 6/1998 | Grochowski | 422/129 |
| 5,776,421 A | 7/1998 | Matsumura et al. | |
| 5,877,331 A | 3/1999 | Mummey et al. | |
| 5,892,108 A | 4/1999 | Shiotani et al. | |
| 6,046,363 A | 4/2000 | Tomoda | |
| 6,284,398 B1 * | 9/2001 | Kiryu | 429/19 |
| 6,527,980 B1 * | 3/2003 | Roden et al. | 252/373 |
| 6,793,700 B1 * | 9/2004 | Pham et al. | 48/198.7 |

FOREIGN PATENT DOCUMENTS

| | | |
|---|---|---|
| DE | 1 063 128 | 8/1959 |
| DE | 1 090 643 | 10/1960 |
| JP | 04 119902 | 4/1992 |

* cited by examiner

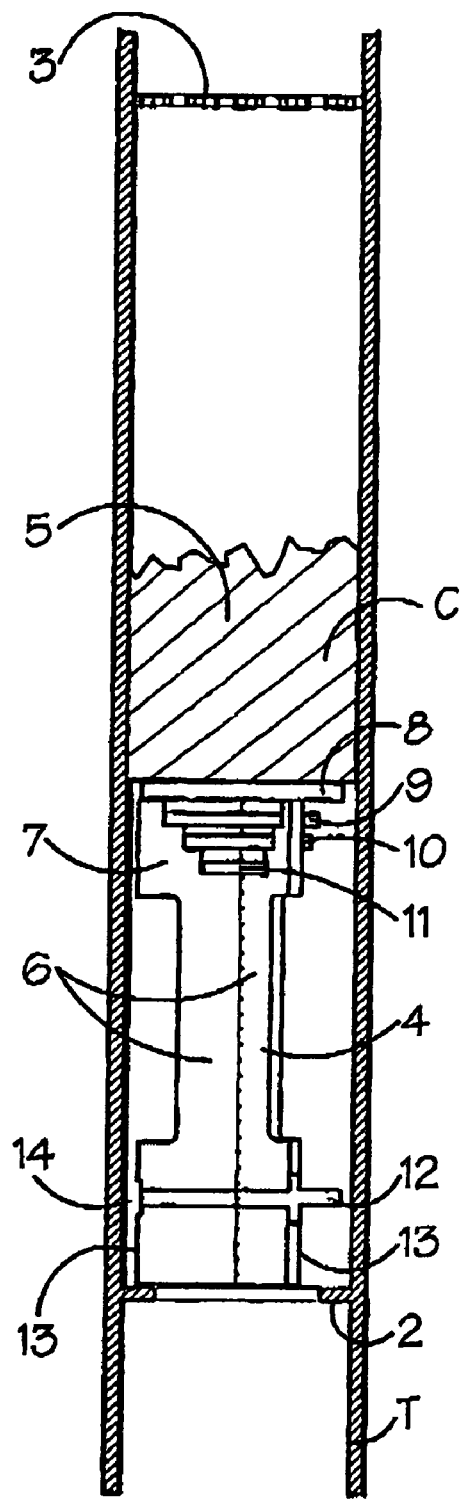
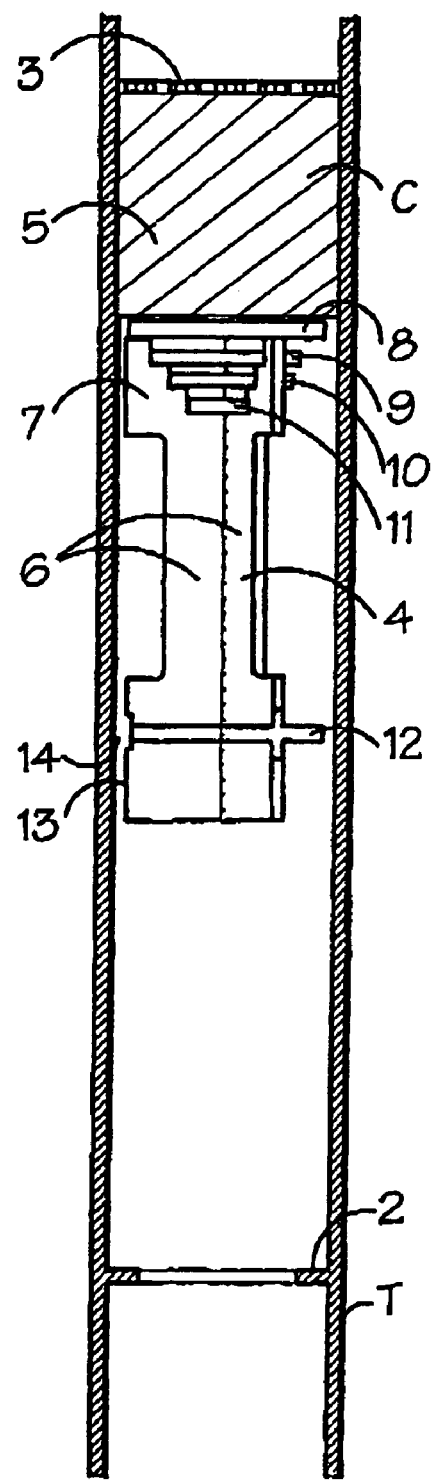
FIG.2.      FIG.3.

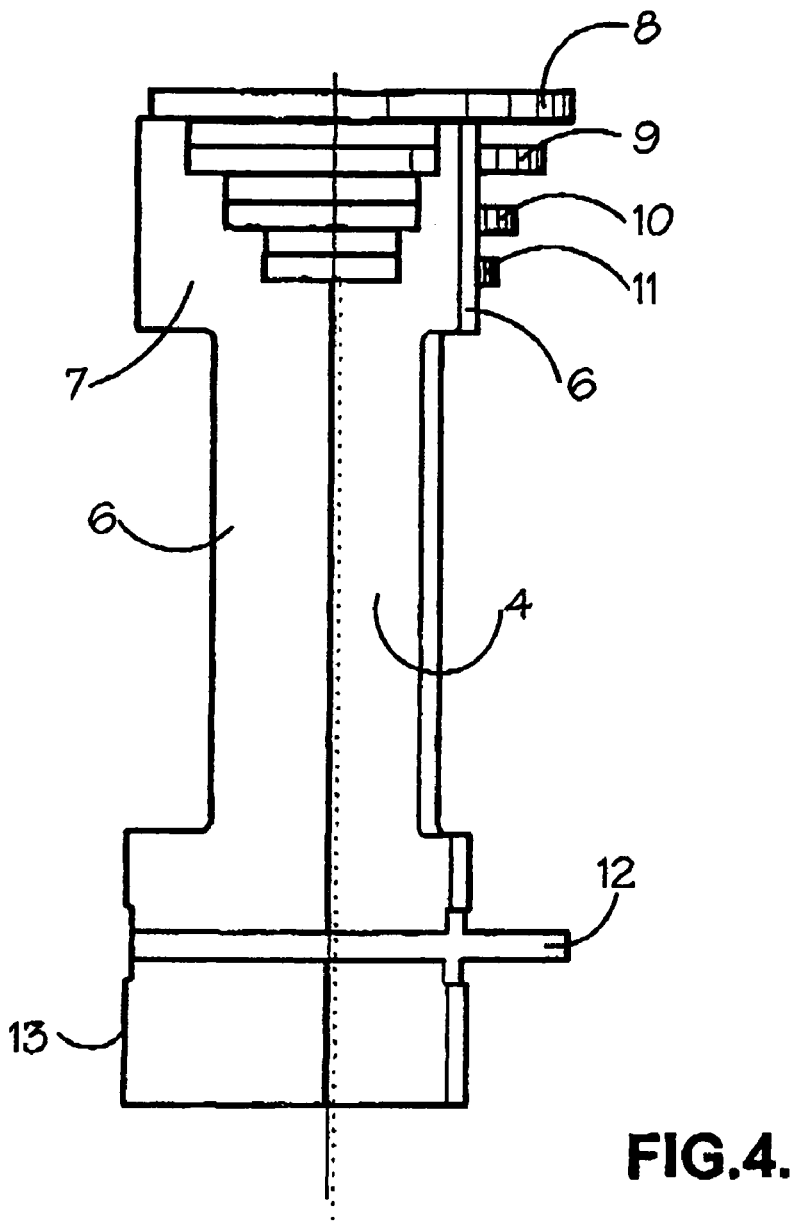
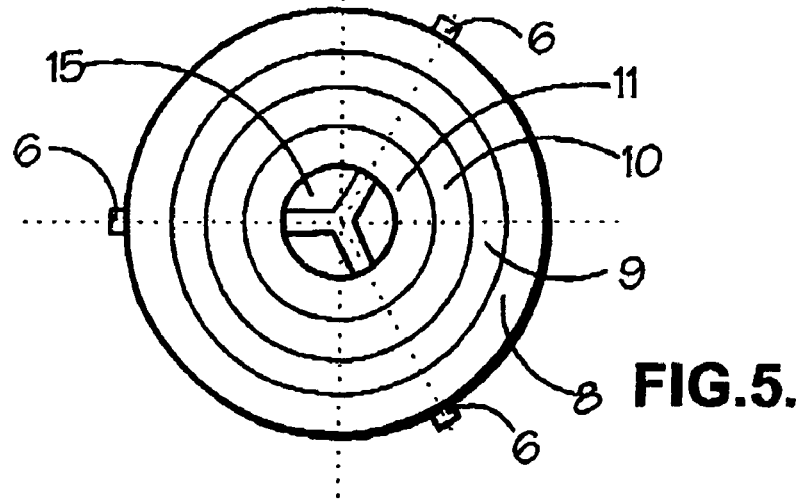
FIG.4.
FIG.5.

FURNACE AND STEAM REFORMING PROCESS

TECHNICAL FIELD OF THE INVENTION

This invention relates to a steam reformer furnace and to a process for effecting steam reforming of a hydrocarbon feedstock to produce a reformed gas mixture, i.e. a mixture of hydrogen and carbon oxides. In particular, it relates to a steam reformer furnace having vertical reformer tubes and to a steam reforming process that uses such a furnace.

BACKGROUND OF THE INVENTION

Steam reforming is a well known reaction. In this reaction a hydrocarbon feedstock, such as natural gas, is reacted with steam at high temperature in the presence of a fixed bed of a steam reforming catalyst. The reactions involved are:

$$CH_4 + H_2O \rightleftharpoons CO + 3H_2; \tag{1}$$

$$CO + H_2O \rightleftharpoons CO_2 + H_2; \text{ and} \tag{2}$$

$$2CO \rightarrow CO_2 + C. \tag{3}$$

The first of these reactions is known as the reforming reaction, the second as the shift reaction, and the third as the carbon reaction.

The reforming reaction is strongly endothermic and is typically carried out at a temperature of at least about 750° C. and at a pressure of from about 100 psia (about 698.48 kPa) to about 600 psia (about 4136.86 kPa). Suitable catalysts include, for example, supported nickel catalysts. The catalyst is usually packed into reformer tubes which are mounted vertically in a reformer furnace. Such reformer tubes are externally fired.

The particulate steam reforming catalyst has a lower coefficient of expansion than the metal reformer tubes into which it is loaded. Thus, when the furnace heats the reformer tubes to steam reforming temperatures, the catalyst slumps in the vertical reformer tubes because, upon heating, the walls of the reformer tubes expand more than do the catalyst particles. Then, when the temperature is later lowered, the walls of the vertical reformer tubes contract as they cool and the catalyst particles are caught as if by a tightening corset and are thereby subjected to a crushing force.

Since the steam reforming reaction involves use of high temperatures of, for example, about 750° C., the amounts by which the tube walls expand are significant. Moreover, because the catalyst particles are contained in a narrow vertical tube having, for example, a nominal diameter of less than about 6 inches (about 15.24 cm), very high crushing forces can be generated. This tends to result in attrition of the catalyst particles or in damage to the reformer tube wall. Since the vertical reformer tubes are very long and experience considerable expansion over their length during operation of the steam reformer, the catalyst particles can drop by a very significant amount inside a reformer tube but cannot rise back up inside the reformer tube when it cools due to being tightly squeezed by the cooling reformer tube, a factor that exacerbates the crushing tendency.

Repeated heating and cooling cycles lead to a deterioration in the desired characteristics of the packed bed, in that the originally loaded volume of steam reforming catalyst particles is compressed to a higher density, thereby increasing the pressure drop. In addition it has been found that increased pressure drop through a catalyst bed can be caused by, amongst other reasons, breakage of steam reforming catalyst particles resulting from incorrect charging of the catalyst or from differential expansion and contraction between the catalyst and the reformer tube due to temperature cycling at start-up and shut-down. The breakage of catalyst particles gives fragments of a smaller particle diameter, while erosion of the corners of particles gives a lower voidage due to the eroded particles packing more closely together. For further discussion reference may be made to "Catalyst Handbook", 2nd Edition, by Martyn V. Twigg (Wolfe Publishing Ltd., 1989), at page 125. This increased pressure drop generally increases the costs associated with gas compression in the steam reforming process. Because the steam reformer furnace includes many reformer tubes providing parallel fixed beds, this can lead to increasing maldistribution, thereby causing different conversions and selectivities in different tubes. This, in turn, can lead to further problems such as carbon laydown, formation of hot spots (leading to possible tube failure and/or to sintering of the catalyst), and to development of different rates of catalyst deactivation which can further exacerbate the situation. Loss of catalyst surface material by spalling and attrition is particularly serious when the active part of the steam reforming catalyst is in the form of a shallow surface layer because in this case considerable catalyst activity can be lost or the catalyst activity can become maldistributed.

The debris from the crushing forces will accumulate in the, by now, more dense bed and also increase the pressure drop. There will be an increased likelihood of different pressure drops between different reformer tubes in the steam reformer leading to maldistribution of the reactants and reaction products. In addition, the position of the top of the bed within any individual reformer tube will be difficult to predict.

Another problem occurs in that any part of a reformer tube in a steam reformer that does not contain steam reforming catalyst is liable to overheat, with a consequent danger of tube failure, since there is no endothermic reaction being catalysed in that part of the reformer tube to absorb the radiant heat and hence to cool that part of the reformer tube. This makes it important to determine as closely as possible the position of the catalyst bed during operation of the steam reformer furnace so as to minimise the risk of tube failure through local overheating. This is a particular problem with top fired steam reformer furnaces because any slumping of catalyst in the reformer tubes will tend to result in the upper ends of the reformer tubes being uncooled by the endothermic steam reforming furnace at a point where the flame temperatures can be highest.

There is, therefore, a need in the art to provide a steam reformer reactor design which overcomes the problems associated with crushing of the steam reforming catalyst particles when the reactor is subjected to temperature cycles of heating to high temperatures followed by cooling again, and which allows low pressure drop through the catalyst bed, minimises pressure drop build-up, and allows the position of the bed to be fixed with a high degree of certainty so as to minimise the risk of tube failure.

This need has been recognised previously and there are various examples in the prior art of attempts to overcome the problems outlined above.

The crushing of catalysts by radial forces due to wide temperature cycles in tubular reactors, such as steam reforming reactors, has been recognised in U.S. Pat. No. 4,203,950 (Sederquist). In this document it is proposed that the catalyst should be arranged in an annulus with at least one wall being flexible.

In U.S. Pat. No. 5,718,881 (Sederquist et al.) a steam reformer has segmented reaction zones with individual supports for different temperature zones, the volume of the segments of catalyst being inversely proportional to the temperature of the various zones in the reformer.

The use of flexible louvered screens to accommodate particle movement is proposed in U.S. Pat. No. 3,818,667 (Wagner). Louvers are also proposed in a catalytic converter for catalytically treating the exhaust gases from an internal combustion engine in U.S. Pat. No. 4,063,900 (Mita et al.), and in U.S. Pat. No. 4,052,166 (Mita et al.).

It is proposed in U.S. Pat. No. 3,838,977 (Warren) to use springs or bellows in a catalytic muffler to control bed expansion and contraction so as to maintain a compacted non-fluidised or lifted bed. Spring loading to maintain a bed of carbon granules tightly packed within a fuel vapour storage canister housing is described in U.S. Pat. No. 5,098,453 (Turner et al.).

A ratchet device to follow the decrease in volume of a bed but restrain back-movement of an upper perforated retaining plate is proposed in U.S. Pat. No. 3,628,314 (McCarthy et al.). Similar devices are described in U.S. Pat. No. 4,489,549 (Kasabian), in U.S. Pat. No. 4,505,105 (Ness), and in U.S. Pat. No. 4,554,784 (Weigand et al.).

Pneumatic sleeves inside a catalyst bed to restrain movement of the particulate material are proposed in U.S. Pat. No. 5,118,331 (Garrett et al.), in U.S. Pat. No. 4,997,465 (Stanford), in U.S. Pat. No. 4,029,486 (Frantz), and in U.S. Pat. No. 4,336,042 (Frantz et al.).

However, these prior art proposals are elaborate and do not solve satisfactorily the problem of crushing of particulate steam reforming catalysts which can be caused by repeated temperature cycling of a reformer tube.

Catalysts, for use in the steam reforming of hydrocarbons, are usually passed over a screen to remove dust and broken pieces either before shipment and/or before loading in the reformer tubes of a steam reformer. Such removal of dust and broken pieces of steam reforming catalyst is desirable in order to minimise the pressure drop across the reformer tubes caused by the catalyst bed. This screening step constitutes a costly procedure both in terms of finance and time. Once loaded, catalyst particles usually cannot be re-arranged and the packed density only tends to increase.

The loading of catalysts into vertical steam reformer tubes can be achieved by a number of methods to reduce breakage and damage caused by free fall loading. For example, "sock" loading can be used in which the catalyst is put into long "socks", usually made of fabric, which are folded or closed at one end with a releasable closure or tie which can be pulled to release catalyst when the sock is in position. Another method utilises wire devices or wires in tubes which reduce falling velocities. One option is to utilise one or more spirals of wire inside the tube so that the catalyst particles bounce their way down the tube and do not undergo free fall over the full height of the tube. As the tube is filled, so the wire is withdrawn upwardly, optionally with vertical fluctuations. Such devices are proposed, for example, in U.S. Pat. No. 4,077,530 (Fukusen et al.).

A further possibility is to use a line having spaced along its length a series of brush-like members or other damper members and to withdraw the line upwardly as the catalyst particles are fed into the tube, as described in U.S. Pat. No. 5,247,970 (Ryntveit et al.).

Each method of loading produces fixed beds with different bulk densities. The density differences can be quite marked.

In some applications it is desirable to maximise the amount of catalyst loaded, despite increased pressure drop through the fixed bed, in which case loading into liquid may be used and/or the tubes may be vibrated.

U.S. Pat. No. 5,892,108 (Shiotani et al.) proposes a method for packing a catalyst for use in gas phase catalytic oxidation of propylene, iso-butylene, t-butyl alcohol or methyl t-butyl ether with molecular oxygen to synthesise an unsaturated aldehyde and an unsaturated carboxylic acid in which metal Raschig rings are used as auxiliary packing material.

In U.S. Pat. No. 5,877,331 (Mummey et al.) there is described the use of a purge gas to remove fines from a catalytic reactor for the production of maleic anhydride which contains catalyst bodies. In this procedure the purging gas, such as air, is passed through the catalyst bed at a linear flow velocity sufficient to fluidise the catalyst fines but insufficient to fluidise the catalyst bodies. At column 15 lines 16 to 18 it is said:

"In order to prevent fluidization or expansion of the catalyst bed during further operation of the reactors, and in particular to prevent the catalyst bodies in the fixed catalyst bed from abrading against one another or against the tube walls, a restraining bed comprising discrete bodies of a material substantially denser than the catalyst was placed on top of the column of catalyst in each tube of the reactors."

It is also taught that this upflow removes fine particles which, if left in the densely packed vessel, may contribute to plugging of the bed.

In U.S. Pat. No. 4,051,019 (Johnson) there is taught a method for loading finely divided particulate matter into a vessel for the purpose of increasing the packing density by introducing a fluid medium counter-current to the downward flow of the finely divided particulate matter at a velocity selected to maximise the apparent bulk density of the particulate matter in the vessel. It is taught that this method also provides a method of removing undesirable fine particles which, if left in the densely packed vessel, might contribute to plugging of the bed.

Vibrating tubes with air or electrically driven vibrators and/or striking with leather-faced hammers is described in the afore-mentioned reference book by Twigg at page 569, the latter being used to further compact the catalyst in those tubes showing low pressure drop in multi-tube applications, in order to achieve equal pressure drops in each tube.

An upflow tubular steam reformer is described in U.S. Pat. No. 3,990,858 (O'Sullivan et al.). In this proposal fluidisation of the particulate material in the catalyst tubes is prevented by providing a weighted conically shaped hollow member which rests on top of the bed of particulate material. This conically shaped hollow member is provided with elongated slots whereby fluid exiting from the bed flows into the interior of the hollow member, through the slots and into the tube outlet.

Steam reformers have traditionally been extremely large items of equipment However, in more recent years more compact designs of steam reformer have been developed. Examples include U.S. Pat. No. 4,098,587 (Krar et al.), U.S. Pat. No. 4,098,588 (Buswell et al.), and U.S. Pat. No. 4,098,589 (Buswell et al), as well as International Patent Publication No. WO 99/02254 (BP Exploration Operating Company Limited et al.) and U.S. Pat. No. 5,567,398 (Ruhl et al.). This last mentioned specification recommends the use of long thin flames to heat the reformer tubes in order to avoid excessive heating of the reformer tubes and provide high reformer tube life expectancy.

A slab reformer design is described in U.S. Pat. No. 4,430,304 (Spurrier et al.).

In U.S. Pat. No. 5,776,421 (Matsumara et al.) there is taught a reforming reactor which includes a reforming chamber in which are disposed a plurality of gas flow passages with reforming blocks containing reforming catalysts, with the locations of the reforming blocks in adjacent gas flow passages differing along the gas flow path so that adjacent reforming sections are staggered in the flow direction.

U.S. Pat. No. 4,292,274 (Faitani et al.) is concerned with a burner arrangement for a catalytic reaction furnace.

There is a need to obviate in a simple and reliable way the problems caused by crushing or attrition of particulate steam reforming catalysts, which are subjected to cycling between high and low temperatures in reformer tubes of a steam reformer furnace, especially those with small diameter tubes such as are used in compact reformer designs. There is a further need to provide an improved method of packing the reformer tubes of a steam reformer furnace with a steam reforming catalyst. There is a still further need to provide a novel method of packing the reformer tubes of a steam reformer furnace with a steam reforming catalyst in which the risk of generating catalyst fines during the loading procedure is substantially obviated, thereby avoiding inadvertently increasing the pressure drop across a reformer tube due to undesirable amounts of small particulate material. Additionally there is a need to provide a novel tubular steam reformer in which the risk of an unwanted increase in pressure drop as a result of catalyst attrition is substantially obviated. There is a yet further need to provide a design of tubular steam reformer in which the pressure drop across the charge of catalyst in each of the tubes remains substantially the same as that across each of the other reformer tubes throughout the operating life of the catalyst.

SUMMARY OF THE INVENTION

The present invention accordingly seeks to provide a novel steam reforming process in which the risk of crushing of the catalyst particles due to temperature cycling of the reformer tubes is minimised.

It further seeks to provide an improved steam reforming process in which the catalyst during its useful life is subjected to cyclic temperature variations between campaigns at elevated steam reforming temperatures of at least about 750° C. and ambient temperature, during maintenance of the steam reformer furnace, without subjecting the catalyst particles to undue mechanical stresses.

In addition, the present invention seeks to provide a steam reforming process which is carried out in reformer tubes at elevated temperatures under conditions which minimise imposition of crushing forces on the catalyst, particularly during cooling of the tubes, and which facilitate removal of fragments of the catalyst particles formed by attrition of the particles of catalyst so as substantially to obviate any significant increase of pressure drop.

Furthermore the invention seeks to provide a new and improved method of packing the tubes of a steam reformer furnace with a steam reforming catalyst.

Yet another objective of the present invention is to provide a method of operating a catalytic steam reformer whose tubes are packed with steam reforming catalyst particles wherein the position of the top of the catalyst bed in each tube is known with certainty despite the use of elevated steam reforming temperatures which cause the reformer tubes to expand both longitudinally and radially.

It is also an objective of the present invention to provide an improved design of steam reformer furnace in which the risk of tube failure is substantially obviated.

Yet again it is a further objective of the invention to provide an improved form of steam reformer furnace in which the position of the top of the catalyst bed in relation to the flames by means of which the reformer tubes are heated is at all times known with certainty during operation of the furnace.

It is also sought to provide a steam reformer furnace in which the risk of damage to the catalyst as a result of experiencing crushing forces during temperature cycling of the catalyst in the reformer tubes is substantially avoided.

The invention additionally seeks to provide an improved tubular steam reformer in which the risk of an unwanted increase in pressure drop as a result of catalyst attrition is substantially obviated.

In addition, the invention seeks to provide a design of compact tubular steam reformer in which the pressure drop across the charge of catalyst in each of the tubes remains substantially the same as that across each of the other reformer tubes throughout the operating life of the catalyst.

According to one aspect of the present invention there is provided a steam reforming process in which a hydrocarbon feedstock is subjected to steam reforming by reaction under steam reforming conditions with steam in the presence of a steam reforming catalyst to produce a reformed gas mixture comprising carbon oxides and hydrogen, which process comprises the steps of:

(a) providing a steam reforming furnace containing a plurality of substantially vertical reformer tubes, each reformer tube having a feed inlet at its lower end in communication with a reaction mixture feed manifold, an outlet at its upper end in communication with a reformed gas outlet header, and a catalyst containment zone disposed intermediate its upper and lower ends and containing a charge of a particulate steam reforming catalyst which is insufficient to fill completely the catalyst containment zone;

(b) providing upper retainer means mounted at the upper end of the catalyst containment zone, the upper retainer means being permeable to gas but adapted to retain particles of the particulate steam reforming catalyst in the catalyst containment zone, and follower means movably mounted in the catalyst containment zone beneath the charge of particulate steam reforming catalyst for movement upwardly from a lower end of the containment zone upon upward flow of gas through the catalyst containment zone at a rate beyond a threshold rate;

(c) supplying to the reaction mixture feed manifold a reactant mixture comprising the hydrocarbon feedstock and steam at a rate sufficient to cause the reactant mixture to flow upwardly through each reformer tube at a flow rate which is sufficient to cause the particulate steam reforming catalyst in each reformer tube to rise up towards the upper end thereof and form a cushion of particulate steam reforming catalyst against the underside of the upper retainer means in the respective reformer tube and which is in excess of the threshold rate so as to cause the follower means in the respective reformer tube to move upwardly until it abuts against the underside of the cushion of particulate steam reforming catalyst in the respective reformer tube;

(d) heating each of the plurality of reformer tubes externally by means of the steam reformer furnace so as to maintain steam reforming conditions in each of the plurality of reformer tubes and convert the hydrocarbon feedstock by reaction with steam to form a reformed gas mixture comprising carbon oxides and hydrogen; and (e) recovering resulting reformed gas mixture from the reformed gas outlet header.

The hydrocarbon feedstock may be any liquid or gaseous hydrocarbon feedstock suitable for subjection to steam reforming, for example a petroleum fraction or natural gas. It is preferably pre-treated to remove impurities such as sulphur-containing impurities.

Preferably at least part of the containment zone is of substantially uniform horizontal cross-section. More preferably the containment zone is of substantially uniform horizontal cross-section throughout at least a major part of its height and even more preferably throughout substantially all of its height.

The follower means is adapted to rise upwardly up the containment zone when the upward flow rate of elastic fluid is greater than the threshold flow rate until it abuts against the cushion of particulate steam reforming catalyst. Thus at least that part of the containment zone in which the follower means moves should desirably be of uniform horizontal cross section. For example, it may comprise a tube of substantially circular cross section.

In a preferred embodiment the elongate containment zone comprises a tube which has a length:diameter ratio of from about 50:1 to about 1000:1, more preferably from about 100:1 to about 750:1. Normally such a tube has an internal diameter of about 6 inches (about 15.2 cm) or less, preferably an internal diameter of about 2 inches (about 5.08 cm) or less, e.g. a tube having an internal diameter of from about 1 inch (about 2.54 cm) to about 2 inches (about 5.08 cm).

In many cases it is possible to design the containment zone so that the distance through which the follower means rises up the containment zone in operation is at most only a few inches, for example from about 1 inch (about 2.54 cm) up to about 10 inches (about 25.40 cm), preferably from about 2 inches (about 5.08 cm) to about 5 inches (about 12.70 cm), e.g. about 3 inches (about 7.62 cm).

Although it will frequently be preferred for the containment zone to be of substantially uniform cross-section throughout its height, it is alternatively possible for a lower portion of the containment zone in which the follower means moves in operation to have a smaller area of cross-section than an upper part of the containment zone. Hence the containment zone can comprise a lower tubular portion of relatively small diameter attached to the bottom of a tube of larger diameter. In this case, while the narrower lower portion of the containment zone in which the follower means moves in operation requires to be machined to a relatively close tolerance, the transverse dimensions of the upper portion of the containment zone do not have to be so carefully controlled. A further advantage in such an arrangement is that the gap between the follower means and the walls of the lower portion of the containment zone can be larger than if the follower means is arranged to slide in a larger tube. Again this factor reduces the need for careful machining of the inside of that part of the containment zone in which the follower means moves.

Preferably at least a part of each of the reformer tubes has an internal diameter of about 6 inches (about 15.2 cm) or less, even more preferably about 2 inches (about 5.08 cm) or less, for example from about 1 inch (about 2.54 cm) to about 2 inches (about 5.08 cm).

The upper retainer means is permeable to gas but adapted to retain undamaged particles of the stream reforming catalyst in the containment zone. It may comprise a screen of substantially parallel bars, rods or wires, or a wire mesh or other perforate form of retainer, such as a plate formed with numerous apertures.

Preferably the follower means in each of the reformer tubes is arranged to block passage of gas up the respective catalyst containment zone but permit upward gas flow through a clearance gap between the internal surface of the containment zone and the follower means, the clearance gap providing a clearance less than the smallest dimension of a non-fragmented particle of the particulate steam reforming catalyst. Thus the follower means may comprise a closed lower end portion for defining the clearance gap and an upper portion provided with gas passing means. A suitable form of gas passing means comprises a plurality of substantially concentric rings spaced one from another, the clearance between adjacent rings being less than the smallest dimension of a non-fragmented particle of the particulate steam reforming catalyst. Alternatively the gas passing means may comprise a perforate baffle member whose perforations are smaller than the smallest dimension of a non-fragmented particle of the steam reforming catalyst.

The follower means is thus desirably designed so that there is a gap or gaps through and/or around it for upward flow of gas or reactant mixture therethrough. Moreover the lower end of the containment zone is desirably designed so that, when there is no upward flow of gas or reactant mixture through the containment zone, yet there is a gap or gaps for gas or reactant mixture to flow upwardly through or around the follower means when such upward flow commences but remains below the threshold rate. Thus the follower means typically includes a piston portion which is a loose fit in the containment zone so that gas or reactant mixture can pass up through an annular gap surrounding the piston portion. This piston portion can be disposed at or towards the lower end of the follower means, at or towards the upper end of the follower means, or intermediate the upper and lower ends of the follower means. One of the functions of the follower means is to support the charge of particulate steam reforming catalyst when any upward flow of gas or reactant mixture is insufficient to cause the particulate steam reforming catalyst to rise upwardly in the containment zone to form a cushion against the underside of the upper retainer means. If the piston portion is at or near the upper end of the follower means, then the piston portion can perform this function; if not, then the follower means preferably includes, at or towards its upper end, support means for supporting the charge of particulate steam reforming catalyst when any upward flow of gas or reactant mixture is insufficient to cause particulate steam reforming catalyst to rise upwardly in the containment zone to form a cushion of particulate steam reforming catalyst against the underside of the upper retainer means, for example a series of concentric rings spaced one from another so that the gaps between adjacent pairs of rings are insufficient to allow a particle of predetermined size of the particulate steam reforming catalyst to pass therethrough. Such gaps also assist in distributing the flow of upflowing gas or reactant mixture more uniformly across the cross-section of the containment zone.

Instead of using concentric rings it is alternatively possible to use a mesh arrangement to provide support for the charge of particulate steam reforming catalyst when there is no upward flow of gas or reactant mixture or when any upward flow of gas or reactant mixture is insufficient to cause particulate steam reforming catalyst to rise upwardly in the containment zone to form a cushion of particulate steam reforming catalyst against the underside of the upper retainer means.

The follower means should further be designed so that, despite the annular gap around the piston portion, the follower means cannot tilt sufficiently from a vertical position to become jammed against the walls of the containment zone. In one design this is achieved by providing the piston portion with a series of substantially vertical plates radiating from a vertical axis, for example three vertical plates in a Y-section arrangement, the plates being arranged vertically with their planes at angles of approximately 120° to one another around a substantially vertical axis. Of course, more than three plates can be used, if desired, for example four plates arranged vertically in an X-section at 90° to one another around a substantially vertical axis.

Alternatively, the piston portion can be provided with a central vertical rod with one or more spider sets formed by three or more rods or bars radiating from the central vertical rod, for example three radiating rods set at an angle of approximately 120° to one another and positioned so as to prevent the follower means from tilting a significant amount as it moves within the containment zone and hence from jamming against the walls of the containment zone. In this way the follower means can allow gas or reactant mixture to pass freely at all times around it in either the upward or downward direction, while ensuring that, as the rate of upward flow of gas or reactant mixture is increased to a rate beyond the threshold rate, the follower means lifts smoothly off from its position at the bottom end of the containment zone and then moves up the containment zone until it abuts against the underside of the cushion of particulate steam reforming catalyst.

When the gas or reactant mixture flows upwardly at a low flow rate through the containment zone, the follower means remains at the lower end of the containment zone with the particulate steam reforming catalyst supported on it in the form of a bed. As the upward flow rate increases, the particles of the particulate steam reforming catalyst become fluidised at the upper end of the bed. Upon still further increase of the upward flow rate, the proportion of the bed that is fluidised increases until particles of the steam reforming catalyst begin to rise up the containment zone and form a cushion of particles against the underside of the upper retainer means. When the upward flow rate is sufficient for substantially all of the particles to have lifted, some of the particles on the lower side of the cushion of steam reforming catalyst particles tend to fall off and then be carried up again. At an upward flow rate beyond the threshold flow rate, the follower means is lifted and comes to abut against the underside of the cushion of steam reforming catalyst particles thereby holding the cushion of steam reforming catalyst particles in place and preventing particles from falling off the cushion of steam reforming catalyst particles while the follower means remains in place against the underside of the cushion of steam reforming catalyst particles.

Typically the particles of the particulate steam reforming catalyst have at least one dimension less than about 10 mm. The particles of the steam reforming catalyst may be substantially spherical in shape and have, for example, a diameter of from about 2 mm to about 10 mm, e.g. about 6 mm. However, other catalyst particle shapes can alternatively be used but the use of shapes which can easily form bridges should be avoided. Thus other shapes which can be used include rings, saddles, pellets, cylindrical extrudates, trilobates, quadrilobates, or the like.

Prior to start up of the steam reformer furnace the particulate steam reforming catalyst can be loaded into each of the reformer tubes in turn via the top of its respective catalyst containment zone against a gentle upflow stream of gas, e.g. air, at a rate less than that required to lift fully any already loaded particulate steam reforming catalyst but such that the particles of the steam reforming catalyst as it is loaded do not fall freely under gravity. In this way the danger of damage to the catalyst particles during loading can be significantly reduced or substantially eliminated.

Any other method of loading, e.g. "sock" loading, can, however, be used. Other techniques that can be used include the use of wire devices, the use of devices as described in U.S. Pat. No. 5,247,970 (Ryntveit et al.), or the like.

After initial loading of the particulate steam reforming catalyst and optionally mounting in position the upper retainer means, the pressure drop across the containment zone can be measured in upflow or downflow mode, whereupon, after applying an upflow stream of gas or reactant mixture to the particulate catalyst with the upper retainer means in position, the settled volume of particulate catalyst in the containment zone and/or the pressure drop across the containment zone can be checked, catalyst being added to, or being removed from, the containment zone if the settled volume of particulate catalyst in the containment zone does not correspond to a predetermined value and/or if the pressure drop across the containment zone is not within the desired range. Hence in a preferred procedure, after initial loading of the particulate steam reforming catalyst, the pressure drop across the containment zone is measured in a measurement step. Then particulate steam reforming catalyst can be added to or removed from the containment zone if the pressure drop measured does not conform to a predetermined value. Alternatively, or in addition, after initial loading of the particulate steam reforming catalyst the settled volume of particulate steam reforming catalyst in the containment zone can be measured in a measurement step, whereafter particulate steam reforming catalyst may be added to or removed from the containment zone if the settled volume of particulate steam reforming catalyst in the containment zone does not conform to a predetermined value. In either case, after initial loading of the particulate steam reforming catalyst but prior to the measurement step, elastic fluid can be caused to flow upwardly through the containment zone at a rate in excess of the threshold rate so as to cause the particulate steam reforming catalyst to form a cushion of particulate steam reforming catalyst against the underside of the upper retainer and so as to cause the follower means to rise up the containment zone until it abuts against the underside of the cushion of particulate steam reforming catalyst, thereafter the upward flow of elastic fluid being reduced or discontinued so as to permit formation of a settled bed of particulate steam reforming catalyst.

According to one preferred procedure, for each of the reformer tubes, after initial loading of a charge of the particulate steam reforming catalyst thereinto, the pressure drop at an upward gas flow rate in excess of the threshold rate across the resulting cushion of particulate steam reforming catalyst in that reformer tube is measured. In this procedure all other tubes should be blocked off during measurement of the pressure drop. If necessary, further steam reforming catalyst can be added, if the pressure drop is too low, or some of the steam reforming catalyst can be removed, if the pressure drop is too high. In this way it can be ensured that the pressure drop for each individual tube is essentially the same as the pressure drop for each other tube in the newly loaded reactor.

As well as or instead of measuring the pressure drop caused by the charge of particulate catalyst in the respective reformer tube, the settled volume of the particulate steam reforming catalyst in the reformer tube can be checked. If necessary, more particulate steam reforming catalyst can then be added to, or removed from, the reformer tube if the settled volume of particulate steam reforming catalyst in the reformer tube is less than, or more than, a predetermined value.

The steam reforming catalyst can be of any suitable type, for example a nickel on calcia-alumina catalyst.

Typical steam reforming conditions include use of a temperature in the range of from about 750° C. to about 1050° C. and of a pressure of from about 100 psia (about 689.48 kPa) to about 600 psia (about 4136.86 kPa).

Preferably the steam reformer furnace is top fired so that the burners are disposed at the top of the furnace chamber with the flames, preferably diffusion flames, projecting downwards therefrom and with the hot combustion product gas stream being recovered from a bottom part of the furnace chamber.

The invention further provides a steam reforming furnace for steam reforming of a hydrocarbon feedstock by reaction under steam reforming conditions with steam in the presence of a steam reforming catalyst to produce a reformed gas mixture comprising carbon oxides and hydrogen, which comprises:

(a) a furnace chamber;
(b) a plurality of substantially vertical reformer tubes in the furnace chamber, each reformer tube having a feed inlet at its lower end in communication with a reaction mixture feed manifold, an outlet at its upper end in communication with a reformed gas outlet header, and a catalyst containment zone disposed intermediate its upper and lower ends and containing a charge of a particulate steam reforming catalyst which is insufficient to fill completely the catalyst containment zone;
(c) burner means in the furnace chamber for externally heating the plurality of reformer tubes so as to maintain steam reforming conditions in each of the plurality of reformer tubes and convert the hydrocarbon feedstock by reaction with steam to a reformed gas mixture comprising carbon oxides and hydrogen;
(d) upper retainer means mounted at the upper end of the catalyst containment zone of each of the plurality of reformer tubes, the upper retainer means being permeable to gas but adapted to retain particles of the particulate steam reforming catalyst in the catalyst containment zone;
(e) follower means movably mounted in the catalyst containment zone beneath the charge of particulate steam reforming catalyst for movement upwardly from a lower end of the containment zone upon upward flow of gas through the catalyst containment zone at a rate beyond a threshold rate;
(f) means for supplying to the reaction mixture feed manifold a reactant mixture comprising the hydrocarbon feedstock and steam at a rate sufficient to cause the reactant mixture to flow upwardly through each reformer tube at a flow rate which is sufficient to cause the particulate steam reforming catalyst in each reformer tube to rise up towards the upper end thereof and form a cushion of particulate steam reforming catalyst particles against the underside of the upper retainer means in the respective reformer tube and which is in excess of the threshold rate so as to cause the follower means in the respective reformer tube to move upwardly until it abuts against the underside of the cushion of particulate steam reforming catalyst in the respective reformer tube; and
(g) means for recovering resulting reformed gas mixture from the reformed gas outlet header.

Preferably the reformer tubes are arranged in an array including rows of reformer tubes. Also it will often be preferred for the burner means to comprise a plurality of burners, which can also be arranged in an array within the array of reformer tubes, and even more preferably there are approximately the same number of burners as reformer tubes. Normally the burners for heating the reformer tubes along the edges of the array will be smaller than the burners heating the reformer tubes in the central part of the array of reformer tubes because each of the burners heating the outside reformer tubes of the array may, for example, have to heat only two tubes, whereas the burners heating reformer tubes in the central part of the array may have to heat as many as four reformer tubes.

By providing for downward firing of the burner means the hot combustion gases are directed away from the supports for the reformer tubes which are thus not exposed to such high temperatures as would be experienced in the case of bottom firing of the furnace with upwardly directed flames.

In a preferred form of steam reformer furnace according to the invention the reformer tubes are supported from the top, so that during a period of maintenance when the furnace is shut down, the pigtails at the lower end of the reformer tubes which act as inlets to the reformer tubes can be disconnected from the inlet manifold, which is mounted at the bottom of the furnace, and all of the reformer tubes can be removed as a bundle.

BRIEF DESCRIPTION OF THE DRAWINGS

FIG. 2 is a semi-diagrammatic side view of a vertical reformer tube of the steam reformer furnace of FIG. 1 showing a catalyst follower therein with no upward gas flow;

FIG. 3 is a side view of the vertical reformer tube of FIG. 2 with an upward gas flow at a rate in excess of a threshold gas flow rate;

FIG. 4 is a side view of the catalyst follower of FIGS. 2 and 3 on an enlarged scale;

FIG. 5 is a top plan view of the catalyst follower of FIG. 3;

DETAILED DESCRIPTION OF THE PREFERRED EMBODIMENTS

Figure 1:
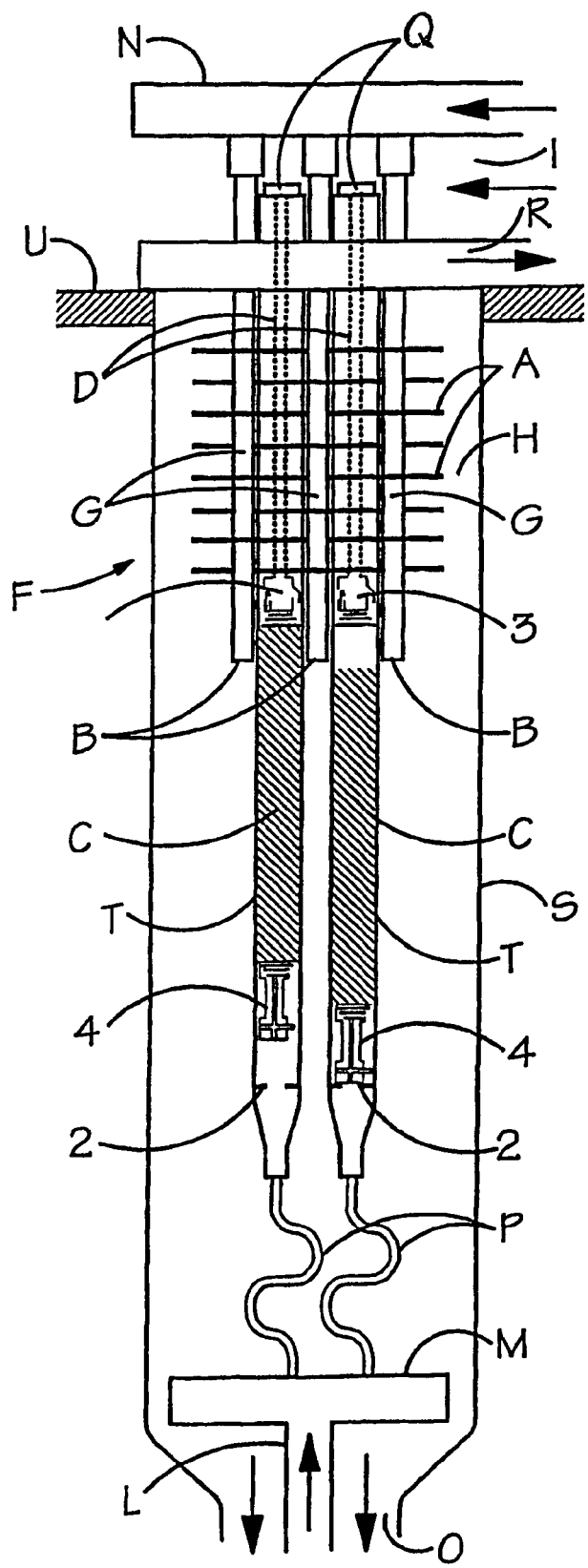
FIG. 1 is a semi-diagrammatic vertical section through a steam reformer furnace constructed in accordance with the teachings of the invention.

Referring to FIG. 1 of the drawings, a steam reformer furnace F comprises a shell S having a thermally insulating lining. A bundle of steam reformer tubes T is suspended in shell S from upper support U, with the axes of tubes T extending vertically. (For the sake of clarity, only two steam reformer tubes T are shown in FIG. 1, although there may in practice be an array of several hundred or more such tubes).

At the upper end of furnace F there are mounted a plurality of fuel tubes G at the lower ends of which are corresponding burners B. There are approximately as many fuel tubes G as there are reformer tubes T. Fuel tubes G are fed from a fuel supply line N. Combustion air is supplied to burners B from air intake I and is heated in a heat exchange section H, through which the air flows in a tortuous path formed by baffles A, by hot reformed gas exiting the upper ends of reformer tubes T. Fuel for burners B is also preheated separately in heat exchange section H by the hot reformed gas. Diffusion flames from burners B extend downwardly through the body of shell S and heat the external surfaces of steam reformer tubes T, thereby supplying the heat needed to sustain the endothermic steam reforming reactions in reformer tubes T. The combustion products exit the furnace shell S through the exhaust gas outlet O at the bottom end thereof and pass onward for heat recovery and eventual discharge to the environment. Reformed gas exits the upper ends of reformer tubes T and is collected by means of header R.

For further information about the design of baffles F reference may be made to International Patent Publication No. WO 99/02254 (BP Exploration Operating Company Limited et al.), the entire disclosure of which is herein incorporated by reference. In addition, reference may be made to U.S. Pat. No. 5,567,398 (Ruhl et al.) for further information regarding the design of the burners B; the entire disclosure of that United States patent specification is also herein incorporated by reference.

At the top end of each reformer tube T there is a cap Q from which is suspended a rod D which supports an upper perforate catalyst retainer 3 which is described in more detail below.

For maintenance purposes pigtails P can be disconnected from the bottom ends of tubes T, whereupon the entire bundle of tubes T can be removed upwardly from furnace F.

At start up, burners B can be supplied through fuel supply line N with natural gas and ignited by means of a retractable igniter (not shown). When all of the burners are safely lit, the fuel supplied to burners B can be switched to a hydrogen-rich gas, such as an off gas from methanol synthesis. Thus, in one method of igniting the burners B the flames are ignited by initially supplying to the burners B a hydrocarbon gas, such as natural gas, and air in amounts capable of forming an ignitable mixture, igniting a flame at one of the burners B using an igniter (not shown) positioned adjacent thereto, allowing a flame to propagate from that burner B to the other burners B of the furnace F, and then, after all the burners B have been lit, altering the composition of the fuel over a period of time, e.g. about 5 to about 60 seconds, so as to replace the hydrocarbon gas by a hydrogen-rich gas until an at least predominantly hydrogen flame is established at each of the burners B. Such a hydrogen-rich gas can be, for example, a methanol plant purge gas.

Tubes T each contain a charge of a supported nickel steam reforming catalyst C and are fed with a preheated mixture of steam and a hydrocarbon, such as natural gas, which is supplied through line L to a feed manifold M, which is connected to the lower ends of tubes T by means of pigtails P. The exhaust gases from burners B provide heat to pigtails P and feed manifold M.

As will be further explained below, the left hand tube T of FIG. 1 is depicted in its operating condition during production of reformed gas; on the other hand, the right hand tube T is depicted in its condition after initial loading of the catalyst or at the end of an operating campaign of the furnace F, with no upward flow of gas or reactant mixture.

In downstream apparatus (not illustrated) the reformed gas collected in header R can be appropriately purified, adjusted in composition to provide a reformed gas of desired composition, and converted to a desired product, such as methanol or ammonia in conventional manner.

In FIG. 2 there is shown one of the steam reformer tubes T of the furnace of FIGS. 1 and 2. Tubes T are used for carrying out a steam reforming process. This process is operated in upflow mode.

Tube T is circular in cross section and has an internal diameter of about 2 inches (about 5.08 cm) and is provided an internal annular ledge 2 or with a removable support with a central vertical aperture, and with an upper perforate retainer 3. It can be made of any suitable material that is substantially inert under the reaction conditions to be used. For example, it can be a stainless steel tube or a tube made of any suitable alloy.

Although steam reformer tube T for convenience usually has a circular cross section, tubes of other cross sections, such as elliptical, hexagonal, or square cross section may be used, if desired.

The length of reformer tube T is a multiple (which can be either a whole number multiple, e.g. 100×, or a fractional number multiple, e.g. 37.954×) of the diameter or other transverse dimension of the reformer tube T. Although reformer tube T as illustrated in FIG. 2 is relatively short, it will be appreciated by those skilled in the art that reformer tube T can be of any convenient length. For example, reformer tube T can be about 6 feet (about 182.88 cm) long or more, e.g. up to about 30 feet (about 914.40 cm) or even about 45 feet (about 1371.60 cm) or more, if desired.

When there is no upward flow of gas or vapour, as illustrated by the right hand reformer tube T of FIG. 1 and in FIG. 2, ledge 2 supports a catalyst follower 4 on top of which is disposed a charge 5 of a particulate steam reforming catalyst C. The settled volume of the charge 5 of particulate steam reforming catalyst C, whether this is densely packed or loosely packed, is less than the available volume between the top of the catalyst follower 4 and the upper perforate retainer 3.

The steam reforming catalyst particles may be of any desired size or shape, for example substantially spherical. Typically the steam reforming catalyst particles have no dimension which is smaller than about 3 mm. They may be substantially spherical particles which have, for example, a diameter of about 6 mm. However, the particles may have any other desired shape, for example, cylinders (optionally with one or more passages formed therein), cylindrical extrudates, or trilobe or quadrilobate extrudates, so long as the shape of the catalyst particles is not conducive to formation of bridges. The steam reforming catalyst particles are sufficiently large not to pass through any annular gap between catalyst follower 4 and the internal wall of reformer tube T nor to pass through upper perforate retainer 3.

The upper perforate retainer 3 is intended to prevent passage of undamaged catalyst particles upwardly beyond upper perforate retainer 3. It will, however, allow dust or small fragments of abraded catalyst to pass upwardly therethrough. It may consist of or include a wire gauze or mesh of appropriate mesh size.

Catalyst follower 4 is made from a suitable material, such as stainless steel, and comprises three plates 6 welded together axially and symmetrically so as to form a Y-section central portion with the plates 6 set at 120° to one another about a vertical axis. The radially outer edges of plates 6 are closely spaced from the internal wall of reformer tube T and help to maintain catalyst follower 4 in an upright position and guide it in its movement up and down the reformer tube as further described below.

As can be seen from FIGS. 3 and 4, and more clearly from FIG. 5, the upper part 7 of each plate 6 has a stepped profile and annular rings 8, 9, 10, and 11 are welded to this stepped profile. The clearance between the annular rings 8, 9, 10, and 11 is less than the average smallest dimension of the undamaged catalyst particles and the lateral dimensions of the rings are so chosen that the catalyst particles cannot drop down through catalyst follower 4 but are retained on the upper side thereof. Near the lower end of catalyst follower 4 the plates 6 are welded to a disc 12 below which there are also welded lower plates 13.

There is an annular gap 14 around disc 12 to allow upward passage of gas or vapour. In addition there is a central aperture 15 at the top end of catalyst follower 4, as can be seen in FIG. 5. However, when gas or vapour passes up reformer tube T at a flow rate in excess of a threshold flow rate, disc 12 acts as a loose piston and so catalyst follower 4 rises in reformer tube 1. The weight of the catalyst follower 4 is so selected, and the size and shape of the catalyst follower 4 are so chosen, that the upward lifting forces due to the upflowing gas or vapour cause catalyst follower 4 to float up the tube T thereby sweeping any non-fluidised particulate material before it and compressing the cushion of steam reformer catalyst particles C against the fixed upper retainer 3.

It will be seen that catalyst follower 4 includes a lower spacer section constituted by plates 13 which serves to hold the piston part formed by disc 12 away from the ledge 2 mounted in tube T when there is no upflow of gas or vapour and when catalyst follower 4 is supported on ledge 2. This results in gas or vapour being able, at all times, to pass freely in upflow past this piston part. Disc 12 allows smooth lift of the catalyst follower 4 in upflow operation. The weight of catalyst follower 4 is selected so that, at the desired operating upflow gas rate, the uplift force caused by the pressure loss across the annular gap 14 between the disc 12 and the inside wall of reformer tube T is greater than the gravitational pull of the total mass of the catalyst follower 4.

FIG. 3 illustrates the reformer tube T when gas or vapour is flowing up the reformer tube T at a flow rate in excess of a threshold flow rate, this threshold flow rate being a minimum upward flow rate at which the catalyst follower 4 can be caused to move upward by the flowing gas or vapour. (The left hand tube T of FIG. 1 also illustrates this condition). The catalyst particles have lifted to form a cushion of catalyst particles C abutting against the underside of upper perforate retainer 3. In addition catalyst follower 4 has also lifted and is itself pressing against the underside of the cushion of catalyst particles C.

By varying the size of the portions cut out of the radially outer sides of plates 6, it is possible to alter the weight of the catalyst follower 4. It accordingly becomes possible to vary the threshold flow rate, i.e. the upward flow rate of gas or vapour within a given tube T at which the catalyst follower 4 will lift from ledge 2.

If desired, concentric rings 8, 9, 10, and 11 can be replaced by a gauze or lattice arrangement.

Figure 6:
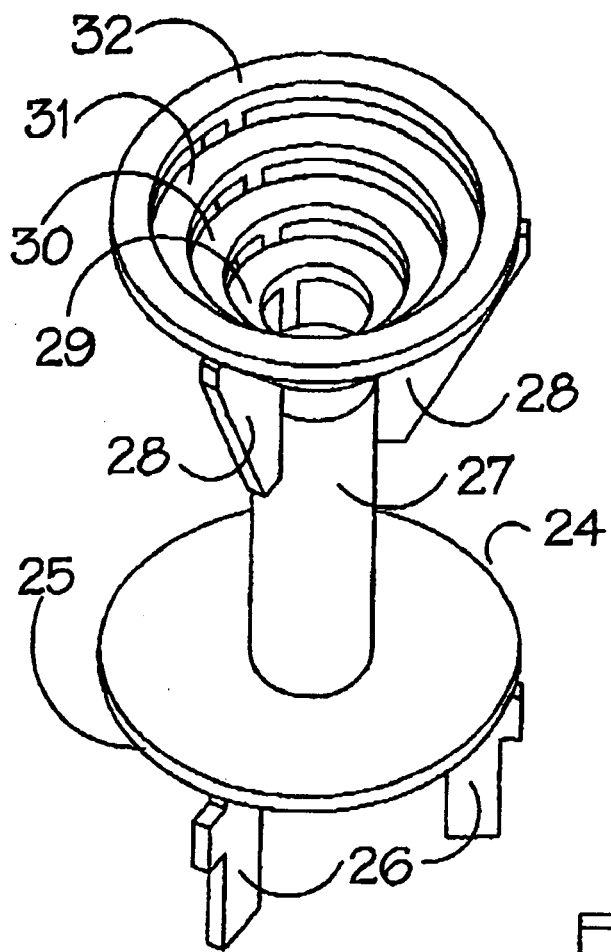
FIG. 6 is a perspective view from above of an alternative catalyst follower.
Figure 7:
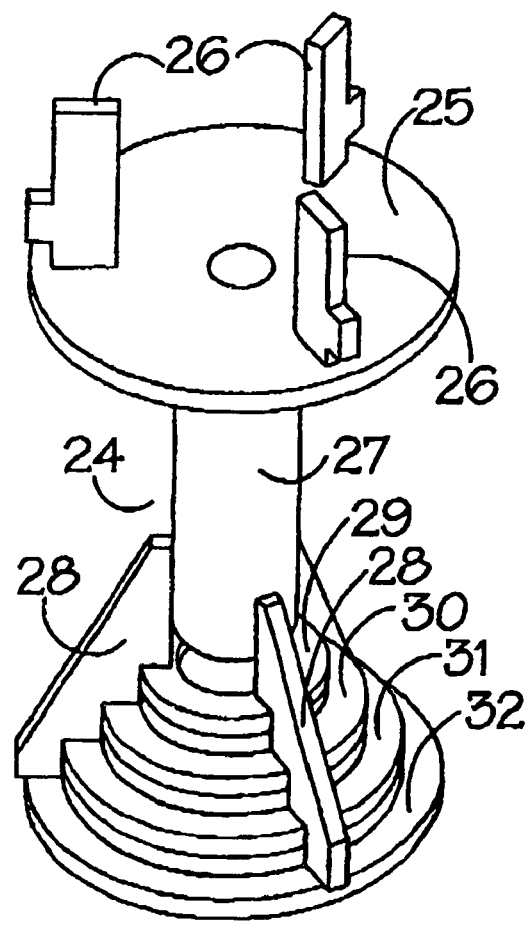
FIG. 7 is a perspective view from below of the catalyst follower of FIG. 6.

An alternative form of catalyst follower 24 is illustrated in FIGS. 6 and 7. This is cast from a suitable alloy. This comprises a bottom disc 25 below which are three spacer elements 26 that are set at 120° to one another and that serve to support catalyst follower 24 on the ledge 2 when there is no upflow of gas through reactor tube T. The gaps between spacer elements 26 and the annular gap around bottom disc 25 serve to permit gas to flow upwards around catalyst follower 24 at low gas velocities and to permit catalyst follower 24 to lift off from ledge 2 when the upward gas flow rate exceeds the threshold rate. Above disc 25 is a rod portion 27 from whose upper end project three stepped flanges 28, which are radially spaced one from another around the axis of the rod portion 27 by an angle of 120°. Secured to flanges 28 are a series of rings 29, 30, 31 and 32, the spacing between adjacent rings being less than the smallest dimension of an undamaged catalyst particle. In this way catalyst particles cannot pass down the tube below catalyst follower 24 whereas gas or other elastic fluid can pass up the tube at flow rates both below and above the threshold value at which catalyst follower 24 will lift off the ledge 2.

Instead of providing reformer tube T with an internal ledge 2, it is expedient to replace the ledge 2 by a number of small inwardly directed projections, for example, 3 or 4 small projections, the spaces between which provide a passage for upward flow of elastic fluid past bottom disc 25. In this case plates 13 or spacer elements 26 would not be required. Alternatively ledge 2 can be replaced by a removable support device which is formed with a central vertical aperture so as to enable the contents of reformer tube T to be emptied downwardly, if necessary.

The operation of a preferred process using the apparatus of FIGS. 1 to 4 will now be described. The apparatus of FIGS. 5 and 6 can be used in a similar way.

In order to load catalyst particles into tube T, any suitable method can be used. For example, if the catalyst is sufficiently robust, upper perforate retainer 3 can be removed and the catalyst C then carefully poured in until the desired amount has been introduced. Since reformer tube T is of relatively small cross section, the catalyst particles tend to collide with the walls of the tube T and thus do not ever undergo absolutely free fall. Hence their passage down the reformer tube T results in their rattling their way down the tube T rather than undergoing free fall. If the catalyst is of a frangible nature, then any of the previously mentioned techniques using wires, wire coils, or the devices of U.S. Pat. No. 5,247,970 (Ryntveit et al.) can be used. Alternatively the "sock" technique can be used, for example.

After loading of the catalyst charge the settled volume of the catalyst can be measured and compared with a design value. If that settled volume is greater than or less than the design value, then some of the catalyst can be removed or more catalyst can be loaded, as appropriate. In addition, before the steam reforming process is brought on line, it will usually be desirable to install the upper perforate retainer 3 and to pass a gas, such as nitrogen, up the tube T at a rate in excess of the threshold rate so as to cause the catalyst and the catalyst follower 4 to rise up the tube T and form a cushion of catalyst particles immediately under the upper perforate retainer 3. This upflow can be maintained for a sufficient length of time and at a rate to allow substantially all "fines" particles with a particle size small enough to pass through the upper perforate retainer 3 to pass therethrough and be swept away by the gas. This procedure can be repeated as many times as necessary by reducing the gas flow until the catalyst follower 4 and catalyst fall back down the tube, and then increasing the flow of gas again past the threshold rate. Then the pressure drop across the catalyst charge, either in upflow through the cushion of catalyst or in downflow through the settled bed of catalyst can be measured and compared to a design value. If either the settled volume or the pressure drop are not as desired, then the upper perforate retainer 3 can be removed to permit more catalyst to be added or some of the catalyst to be removed, as appropriate, and the procedure repeated until the measurements indicate that the loading of catalyst in tube T is satisfactory.

At low upflow rates the gas or vapour flows through the settled bed of catalyst particles C. However, as the flow rate increases, so at least some of the catalyst particles C will tend to lift, forming initially a partially fluidised bed above a lower static bed of catalyst particles. As the flow rate is increased, more and more of the catalyst particles C are fluidised and travel up the reformer tube T to form a cushion of catalyst particles C against the underside of upper perforate retainer 3. Any dust or under-sized particles will tend to pass through the upper perforate catalyst retainer 3 during this procedure. Upon further increase of flow rate, substantially all of the catalyst particles C are lifted from on top of catalyst follower 4 into the cushion of catalyst particles C with a relatively small number of particles in motion just under the cushion of catalyst particles C, these moving particles falling away from the cushion under gravity and then being carried back up again by the upflowing gas or vapour. Eventually, as the flow rate increases still further, the catalyst follower 4 moves upwards until it abuts against the underside of the cushion of catalyst particles, as illustrated in FIG. 3, thereby preventing any further movement of the catalyst particles and thus possible attrition thereof.

During this procedure the upflowing gas is an inert gas, e.g. nitrogen or air. Formation of the cushion of steam reforming catalyst can be accomplished at a pressure which is a little in excess of atmospheric pressure. However, it is then preferable to increase the pressure in tubes T to a suitable pressure for effecting steam reforming, for example, a pressure in the range of from about 100 psia to about 600 psia (about 698.48 kPa to about 4136.86 kPa). The burners B can then be ignited, using first natural gas to initiate ignition and then, when all of the burners B have lit, switching the supply to the hydrogen-rich fuel. When the tubes T have reached an appropriate temperature, e.g. about 500° C. or more and preferably at least about 750° C. up to about 1050° C., the inert gas feed is switched to the mixture of steam and hydrocarbon feedstock, e.g. natural gas, to be steam reformed.

In the course of being heated to the elevated operating temperature, the reformer tube T will expand radially and longitudinally and the catalyst, having a lower expansion coefficient, will move to fill the increased space. However, the location of the top of the cushion of catalyst particles will be fixed at all times, while the bottom of the cushion will move upwards marginally. This fixing of the position of the top of the cushion of catalyst i.e. the top of the catalyst bed in operation, is of great advantage in the top-fired steam reformer furnace in which introduction of heat needs to be precisely located relative to the catalyst. Thus the invention has the added benefit of substantially obviating the problem of tube failure through lack of control of the temperature within or outside the catalyst filled tube. Accordingly, since the position of the upper surface of the catalyst bed is fixed by the position of the upper perforate catalyst retainer 3 and that position in relation to the burners B is known with accuracy, there is substantially no risk of a portion of the reformer tube T adjacent the burners B that does not contain catalyst becoming overheated as a result of the endothermic steam reforming reaction not cooling the inner surface of the tube T due to lack of catalyst adjacent the inner surface of the tube T.

At the end of an operating campaign, the burners can be extinguished while maintaining a flow of steam and natural gas through the reactor tubes T as the tubes T and furnace F cool. Next the feed can be switched to nitrogen or to air, either before or after allowing the pressure to return to standby or shutdown pressure conditions. Then the nitrogen or air flow rate can be reduced, thus allowing catalyst follower 4 or 24 and catalyst particles C to drop back in controlled fashion until catalyst follower 4 or 24 again rests on ledge 2 (or on the removable support device, if ledge 2 is replaced by a removable support device, as described above, so as to enable the reformer tube T to be emptied downwardly) and the catalyst particles return gently to the condition illustrated in FIG. 2 with minimum damage to the catalyst.

On re-start in upflow mode, the catalyst will have been partially remixed. The catalyst particles will adopt a consistent low packing density in all the tubes T, while fines and debris will be removed by the gas upflow. Hence the pressure drop across each tube T will remain substantially constant throughout the life of the catalyst.

During the cooling operation at the end of an operating campaign, the gas flow can be increased one or more times to recreate the cushion of catalyst particles against the underside of upper perforate catalyst retainer 3, whereafter the gas flow can again be reduced in order to prevent the formation, during cooling of the reformer tubes T, of any "bridges" of catalyst particles in any of the reformer tubes T, which could otherwise lead to a danger of crushing forces being exerted on the catalyst particles by the contracting walls of that reformer tube T as it cools.

It is also possible to interrupt the operating campaign by reducing the rate of supply of fuel to burners B to permit the reformer tubes T to cool somewhat, and then reducing the flow of steam and natural gas to allow the catalyst particles C and catalyst follower 4 to drop in each tube 7. The steam and natural gas flow can then be returned to a value which causes the cushion of catalyst particles C to be re-formed and catalyst follower 4 to rise again in each tube 7. In the course of re-forming the cushion of catalyst particles, any dust or catalyst fragments will tend to pass through the upper perforate catalyst retainer 3, thus removing a potential cause of undesired increase of pressure drop across the catalyst cushion. Thereafter the supply of fuel to burners B can be increased again to continue the operating campaign.

Since it is desirable to pack each steam reformer tube T with catalyst in exactly the same manner so that the pressure drop across each catalyst tube is substantially identical to the corresponding pressure drop for every other tube T of the reformer furnace, the tubes T can be loaded in turn by the general method described above. In this case an upflow of a gas, such as nitrogen or air, can be used in order to reduce the falling velocity of the particulate catalyst material. This air flow can be applied solely to the tube T being loaded from the manifold M by plugging the upper ends of all other tubes T, or by applying air to the bottom of each reformer tube T in turn after having temporarily disconnected its corresponding pigtail P. The latter option is preferred because other operations can be then be performed on the loaded tube while other tubes are being loaded.

The furnace F has many benefits due to the use of downfiring of the burners B. Since the flames are directed downwardly within the shell S, the combustion gases do not impinge on the upper support U which remain relatively cool compared to the corresponding upper support or supports for the tubes of upfired furnace designs. Similarly all of the structure above burners B remains at temperatures which are well below the maximum flame temperature. This means that the whole weight of the bundle of tubes T can be borne by the upper support U and no separate support of the lower ends of the reformer tubes T is necessary. This in turn means that the reformer tubes 7 can each expand and contract lengthwise independently of the other reformer tubes T. If it is desired to remove the bundle of tubes T for maintenance purposes, then after disconnecting the pigtails P from the bottoms of the reformer tubes T, the entire bundle of tubes T, together with the burners B, the heat exchange section H and the header R can be lifted upwards separately or together out of shell S.

Since the flow of gas is upward in tubes T the cushion of catalyst particles C is relatively loosely packed so that a favourably low pressure drop across the bed catalyst charge in each tube T can be maintained. Moreover any "fines" particles of catalyst will tend to be carried away upwardly from the cushion of catalyst particles C through the upper retainer 3 by the upflowing gases. Hence these "fines" particles of catalyst will not remain in the catalyst charge to cause an undesirable pressure drop across the catalyst charge in the individual reformer tubes T. As a result the pressure drop across each of the reformer tubes T will remain substantially constant or will change relatively little throughout the life of the catalyst charge. Thus at any time the pressure drop across each reformer tube T can be maintained substantially the same as the pressure drop across each of the other reformer tubes T.

Another benefit of the use of downwardly directed flames is that the relatively large heat exchanger section H, in which the fuel for burners B and the combustion air therefor are heated by the hot reformed gases and whose horizontal cross-sectional size may exceed that of the furnace shell S, is positioned above reformer tubes T and so can readily be lifted off from the top of the furnace shell S.

The invention is further illustrated by means of the following Examples.

EXAMPLE 1

A glass tube 1, which was 2 metres long with an internal diameter of 38.1 mm, was set up vertically with a follower 4 of the type illustrated in FIGS. 1 to 4 initially positioned at its bottom end. This follower 4 had a disc 12 of diameter 36 mm. A charge of 1.84 kg of a nickel catalyst (12% nickel on calcia-alumina support catalyst balls of nominal diameter 6 mm) was dropped carefully into the tube. After loading, the upper perforate catalyst retainer 3 was fitted at a desired height in the tube 1. This retainer consisted of a Johnson wedge-wire screen comprising 1.5 mm wire with a 2 mm gap. The tube 1 was not filled fully to allow for the lower bulk density of the catalyst during the tests. Compressed air was introduced via a pressure regulator and flow rotameter (not shown) to the bottom of the tube 1 at a rate at least sufficient to lift the catalyst and the catalyst follower 4 such that a consolidated cushion of catalyst balls 5 was formed at the top of the tube 1 immediately under the retainer 3. The height of the catalyst bed 5 was measured before introducing air. The air flow was then reduced to allow the catalyst follower 4 to move back down to the bottom of tube 1 and also to allow the catalyst balls to move back down to the bottom of the tube 1. This procedure was repeated a number of times, from which data the following average apparent bulk densities in kg/m³ were determined. The densities were found to be very repeatable, with the following small variations over 360 tests during which the catalyst was removed and replaced after 10, 20 and 120 tests:

| | |
|---|---|
| After loading (free drop) | 1157 +/− 1.0% (over four loadings) |
| Lifted (with air flow) | 1017 +/− 0.5% (within any one loading) |
| Lifted (with air flow) | 1017 +/− 1.5% (over all the tests) |
| Dumped (with no air flow) | 1000 +/− 0.5% (within any one loading) |
| Dumped (with no air flow) | 1000 +/− 1.0% (over all the tests) |

EXAMPLE 2

The weight of catalyst used in Example 1 was checked after 10, 20, 120 and 360 tests and showed 0.38% weight loss over 360 tests. In separate tests in the same apparatus the flow resistance of the fresh and worn catalyst particles used in Example 1 was compared. At an air flow rate of 49.14 Nm³/h the fresh catalyst particles exhibited a pressure drop of $1.21 \times 10^5$ Pa/m, while at an air flow rate of 48.96 Nm³/h the worn catalyst particles, after 360 tests, exhibited a flow resistance of $1.22 \times 10^5$ Pa/m.

EXAMPLE 3

The procedure of Example 1 was followed using 2.06 kg of nickel on α-alumina support catalyst balls of nominal diameter 6 mm from Dycat, Type 54/98. This catalyst support material is much more friable than that used in Examples 1 and 2 with only about 25% of the crush strength of the catalyst used in Examples 1 and 2. The weight of the catalyst was checked after 10, 60, 150, 300 and 390 tests and showed a total weight loss of 7.0% over 390 tests. During the tests catalyst fragments represented by this weight loss were visibly removed from the bed by the gas flow as dust. The amount lost in each group of tests decreased as follows, expressed as average weight % lost per lift and drop cycle: 0.085, 0.042, 0.026, 0.010, 0.009.

EXAMPLE 4

In separate tests in the same apparatus as was used in Examples 1 to 3 the flow resistance of the fresh catalyst particles and of the worn catalyst particles, after 390 tests, was compared. At an air flow rate of 49.67 Nm³/h the fresh catalyst particles exhibited a pressure loss of $1.15 \times 10^5$ Pa/m, while at an air flow rate of 49.77 Nm³/h the worn catalyst particles exhibited a pressure loss of $1.32 \times 10^5$ Pa/m. The increase in pressure loss can be attributed to be due mainly to the reduced voidage (measured as 0.462 fresh and 0.449 worn) and the reduced size of the worn particles (which was estimated to be equivalent to a reduction in diameter, compared to the fresh catalyst particles, of 2%). This Example demonstrates that, because the process substantially removes the fines resulting from particle wear, the process allows the pressure drop in operation to remain as low as can be practically expected.

The invention claimed is:

1. A steam reforming process in which a hydrocarbon feedstock is subjected to steam reforming by reaction under steam reforming conditions with steam in the presence of a steam reforming catalyst to produce a reformed gas mixture comprising carbon oxides and hydrogen, which process comprises the steps of:

(a) providing a steam reforming furnace containing a plurality of substantially vertical reformer tubes, each reformer tube having a feed inlet at its lower end in communication with a reaction mixture feed manifold, an outlet at its upper end in communication with a reformed gas outlet header, and a catalyst containment zone disposed intermediate its upper and lower ends and containing a charge of a particulate steam reforming catalyst which is insufficient to fill completely the catalyst containment zone;

(b) providing upper retainer means mounted at the upper end of the catalyst containment zone, the upper retainer means being permeable to gas but adapted to retain particles of the particulate steam reforming catalyst in the catalyst containment zone, and follower means movably mounted in the catalyst containment zone beneath the charge of particulate steam reforming catalyst for movement upwardly from a lower end of the containment zone upon upward flow of gas through the catalyst containment zone at a rate beyond a threshold rate;

(c) supplying to the reaction mixture feed manifold a reactant mixture comprising the hydrocarbon feedstock and steam at a rate sufficient to cause the reactant mixture to flow upwardly through each reformer tube at a flow rate which is sufficient to cause the particulate steam reforming catalyst in each reformer tube to rise up towards the upper end thereof and form a cushion of particulate steam reforming catalyst against the underside of the upper retainer means in the respective reformer tube and which is in excess of the threshold rate so as to cause the follower means in the respective reformer tube to move upwardly until it abuts against the underside of the cushion of particulate steam reforming catalyst in the respective reformer tube;

(d) heating each of the plurality of reformer tubes externally by means of the steam reformer furnace so as to maintain steam reforming conditions in each of the plurality of reformer tubes and convert the hydrocarbon feedstock by reaction with steam to form a reformed gas mixture comprising carbon oxides and hydrogen; and (e) recovering resulting reformed gas mixture from the reformed gas outlet header.

2. A process according to claim 1, wherein at least part of each of the reformer tubes has an internal diameter of about 6 inches (about 15.2 cm) or less.

3. A process according to claim 1, wherein at least part of each of the reformer tubes has an internal diameter of about 2 inches (about 5.08 cm) or less.

4. A process according to claim 1, wherein at least a part of each of the reformer tubes has an internal diameter of from about 1 inch (about 2.54 cm) to about 2 inches (about 5.08 cm).

5. A process according to claim 1, wherein the follower means in each of the reformer tubes is arranged to block passage of gas up the respective catalyst containment zone but permit upward gas flow through a clearance gap between the internal surface of the containment zone and the follower means, the clearance gap providing a clearance less than the smallest dimension of a non-fragmented particle of the particulate steam reforming catalyst.

6. A process according to claim 5, wherein the follower means comprises a closed lower end portion for defining the clearance gap and an upper portion provided with gas passing means.

7. A process according to claim 6, wherein the gas passing means comprises a plurality of substantially concentric rings spaced one from another, the clearance between adjacent rings being less than the smallest dimension of a non-fragmented particle of the particulate steam reforming catalyst.

8. A process according to claim 1, wherein the particles of the particulate steam reforming catalyst have at least one dimension less than about 10 mm.

9. A process according to claim 1, wherein the particles of the steam reforming catalyst are substantially spherical in shape.

10. A process according to claim 1, wherein prior to start up of the steam reformer furnace the particulate steam reforming catalyst is loaded into each of the reformer tubes via the top of its respective catalyst containment zone against an upflow stream of gas at a rate less than that required to lift fully the particles of the particulate steam reforming catalyst but such that the particles of the steam reforming catalyst do not fall freely under gravity.

11. A process according to claim 10, wherein after initial loading of a charge of the particulate steam reforming catalyst into a reformer tube, the pressure drop across the charge of particulate steam reforming catalyst in that reformer tube is measured in a measurement step.

12. A process according to claim 11, wherein particulate steam reforming catalyst is added to or removed from that reformer tube if the pressure drop measured does not conform to a predetermined value.

13. A process according to claim 11, wherein after initial loading of the charge of particulate steam reforming catalyst but prior to the measurement step a gas is caused to flow upwardly through the reformer tube so as to cause the particulate steam reforming catalyst to form a cushion of particulate steam reforming catalyst against the underside of the upper retainer means and so as to cause the follower means to move upwardly until it abuts against the underside of the cushion of particulate steam reforming catalyst, and thereafter the upward flow of gas is reduced or discontinued so as to permit formation of a settled bed of particulate steam reforming catalyst.

14. A process according to claim 10, wherein after initial loading of a charge of particulate steam reforming catalyst into a reformer tube the settled volume of the particulate steam reforming catalyst in the reformer tube is measured in a measurement step.

15. A process according to claim 14, wherein particulate steam reforming catalyst is added to or removed from the reformer tube if the settled volume of particulate steam reforming catalyst in the reformer tube does not conform to a predetermined value.

16. A process according to claim 1, wherein the steam reforming conditions include use of a temperature in the range of from about 750° C. to about 900° C. and a pressure of from about 100 psia (about 698.48 kPa) to about 600 psia (about 4136.86 kPa).

17. A process according to claim 1, wherein in step (d) the tubes are heated externally by means of flames directed downwardly from burners.

18. A process according to claim 17, wherein fuel supplied to the burners and combustion air therefor are preheated by heat exchange with the hot reformed gas.

19. A process according to claim 17, wherein the reactant mixture supplied from the reaction mixture feed manifold to the reformer tubes is heated by heat exchange with hot combustion gases from the downwardly directed flames.

20. A steam reforming furnace for steam reforming of a hydrocarbon feedstock by reaction under steam reforming conditions with steam in the presence of a steam reforming catalyst to produce a reformed gas mixture comprising carbon oxides and hydrogen, which comprises:
- (a) a furnace chamber;
- (b) a plurality of substantially vertical reformer tubes in the furnace chamber, each reformer tube having a feed inlet at its lower end in communication with a reaction mixture feed manifold, an outlet at its upper end in communication with a reformed gas outlet header, and a catalyst containment zone disposed intermediate its upper and lower ends and containing a charge of a particulate steam reforming catalyst which is insufficient to fill completely the catalyst containment zone;
- (c) burner means in the furnace chamber for externally heating the plurality of reformer tubes so as to maintain steam reforming conditions in each of the plurality of reformer tubes and convert the hydrocarbon feedstock by reaction with steam to a reformed gas mixture comprising carbon oxides and hydrogen;
- (d) upper retainer means mounted at the upper end of the catalyst containment zone of each of the plurality of reformer tubes, the upper retainer means being permeable to gas but adapted to retain particles of the particulate steam reforming catalyst in the catalyst containment zone;
- (e) follower means movably mounted in the catalyst containment zone beneath the charge of particulate steam reforming catalyst for movement upwardly from a lower end of the containment zone upon upward flow of gas through the catalyst containment zone at a rate beyond a threshold rate;
- (f) means for supplying to the reaction mixture feed manifold a reactant mixture comprising the hydrocarbon feedstock and steam at a rate sufficient to cause the reactant mixture to flow upwardly through each reformer tube at a flow rate which is sufficient to cause the particulate steam reforming catalyst in each reformer tube to rise up towards the upper end thereof and form a cushion of particulate steam reforming catalyst particles against the underside of the upper retainer means in the respective reformer tube and which is in excess of the threshold rate so as to cause the follower means in the respective reformer tube to move upwardly until it abuts against the underside of the cushion of particulate steam reforming catalyst in the respective reformer tube; and
- (g) means for recovering resulting reformed gas mixture from the reformed gas outlet header.

21. A steam reformer furnace according to claim 20, wherein at least a part of each of the reformer tubes has an internal diameter of about 6 inches (about 15.2 cm) or less.

22. A steam reformer furnace according to claim 20, wherein at least a part of each of the reformer tubes has an internal diameter of about 2 inches (about 5.08 cm) or less.

23. A steam reformer furnace according to claim 20, wherein at least a part of each of the reformer tubes has an internal diameter of from about 1 inch (about 2.54 cm) to about 2 inches (about 5.08 cm).

24. A steam reformer furnace according to claim 20, wherein the follower means in each of the reformer tubes is arranged to block passage of gas up the respective catalyst containment zone but permit upward gas flow through a clearance gap between the internal surface of the containment zone and the follower means, the clearance gap providing a clearance less than the smallest dimension of an undamaged particle of the particulate steam reforming catalyst.

25. A steam reformer furnace according to claim 24, wherein the follower means comprises a closed lower end portion for defining the clearance gap and an upper portion provided with gas passing means.

26. A steam reformer furnace according to claim 25, wherein the gas passing means comprises a plurality of substantially concentric rings spaced one from another, the clearance between adjacent rings being less than the smallest dimension of an undamaged particle of the particulate steam reforming catalyst.

27. A steam reformer furnace according to claim 20, wherein the particles of the particulate steam reforming catalyst have at least one dimension less than about 10 mm.

28. A steam reformer furnace according to claim 20, wherein the particles of the steam reforming catalyst are substantially spherical in shape.

29. A steam reformer furnace according to claim 20, further including means for supporting the follower means at the lower end of the catalyst containment zone when the upward flow of gas is less than the threshold rate.

30. A steam reformer furnace according to claim 20, wherein the burner means are disposed at a predetermined height within the furnace in relation to the upper retainer means.

31. A steam reformer furnace according to claim 20, wherein the burner means are adapted and arranged to provide a plurality of downwardly directed flames within the furnace chamber.

32. A steam reformer furnace according to claim 31, wherein a heat exchanger section is provided above reformer tubes for heating fuel for the burner means and combustion air therefor by heat exchange with the hot reformed gas.

33. A steam reformer furnace according to claim 31, wherein the feed inlets are heated by hot combustion gases from the downwardly directed flames to effect heating of the reactant mixture from the reactant mixture manifold.

34. A steam reformer furnace according to claim 31, wherein upon disconnection of the feed inlets for maintenance purposes the tubes can be lifted as a bundle for removal from the furnace chamber.

* * * * *